(12) United States Patent
Farivar et al.

(10) Patent No.: US 10,599,952 B1
(45) Date of Patent: Mar. 24, 2020

(54) COMPUTER-BASED SYSTEMS AND METHODS FOR RECOGNIZING AND CORRECTING DISTORTED TEXT IN FACSIMILE DOCUMENTS

(71) Applicant: Capital One Services, LLC, McLean, VA (US)

(72) Inventors: Reza Farivar, Champaign, IL (US); Jeremy Goodsitt, Champaign, IL (US); Vincent Pham, Champaign, IL (US); Austin Walters, Savoy, IL (US); Fardin Abdi Taghi Abad, Champaign, IL (US); Anh Truong, Champaign, IL (US); Mark Watson, Urbana, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/671,597

(22) Filed: Nov. 1, 2019

(51) Int. Cl.
　　*G06K 9/62*　　(2006.01)
　　*G06N 3/04*　　(2006.01)
　　*G06N 3/08*　　(2006.01)

(52) U.S. Cl.
　　CPC ......... *G06K 9/6257* (2013.01); *G06K 9/6255* (2013.01); *G06N 3/0454* (2013.01); *G06N 3/08* (2013.01)

(58) Field of Classification Search
　　None
　　See application file for complete search history.

(56) References Cited

U.S. PATENT DOCUMENTS

| | | | |
|---|---|---|---|
| 2006/0230460 A1* | 10/2006 | Hars ................ | H04N 21/26613 726/27 |
| 2007/0172055 A1* | 7/2007 | Jo ........................... | G06F 21/10 380/210 |
| 2018/0137350 A1* | 5/2018 | Such .................... | G06N 3/0445 |

* cited by examiner

*Primary Examiner* — Vikkram Bali
(74) *Attorney, Agent, or Firm* — Greenberg Traurig, LLP

(57) ABSTRACT

A method includes passing an original text document through distortion filter generators to generate a training dataset that includes distorted text documents. Each distortion filter generator is configured to distort words or letters of words in phrases of text of a facsimile image in a respective unique manner. A neural network model is trained to recognize each respective distortion and match each respective distortion with each respective distortion filter generator based on the training dataset and the original text document. Image data of one facsimile having at least one text distortion is received and inputted to the trained neural network model. The output of the trained neural network model is coupled to an input of an optical character recognition (OCR) engine. The trained neural network model and the OCR engine convert the received image data of the incoming facsimile corrected for the at least one text distortion to machine-encoded text.

20 Claims, 14 Drawing Sheets

US 10,599,952 B1

COMPUTER-BASED SYSTEMS AND METHODS FOR RECOGNIZING AND CORRECTING DISTORTED TEXT IN FACSIMILE DOCUMENTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based systems and methods for recognizing and correcting distorted text in facsimile documents.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that may include at least the following steps of:

passing, by a processor, at least one original text document through a plurality of distortion filter generators to generate a training dataset that may include a plurality of distorted text documents;

wherein each distortion filter generator of the plurality of distortion filter generators may be configured to distort words or letters of words in phrases of text of a facsimile image in a respective unique manner;

wherein each distortion filter generator of the plurality of distortion filter generators may be distinct from every other distortion filter generator in the plurality of distortion filter generators;

training, by the processor, at least one neural network model to recognize each respective distortion and match each respective distortion with each respective distortion filter generator based on the training dataset and the at least one original text document;

receiving, by the processor, image data of at least one facsimile having at least one text distortion;

inputting, by the processor, the received image data of the facsimile to the at least one trained neural network model;

wherein the output of the at least one trained neural network model may be coupled to an input of optical character recognition (OCR) engine;

wherein the at least one trained neural network model and the OCR engine may convert the received image data of the incoming facsimile to machine-encoded text that has been corrected for the at least one text distortion;

storing, by the processor in a memory, the machine-encoded text corrected for the at least one text distortion in the received image data of the incoming facsimile.

In some embodiments, the present disclosure provides an exemplary technically improved computer-based system that may include at least the following components of a memory and a processor. The processor may be configured to:

pass at least one original text document through a plurality of distortion filter generators to generate a training dataset that may include a plurality of distorted text documents;

wherein each distortion filter generator of the plurality of distortion filter generators may be configured to distort words or letters of words in phrases of text of a facsimile image in a respective unique manner;

wherein each distortion filter generator of the plurality of distortion filter generators may be distinct from every other distortion filter generator in the plurality of distortion filter generators;

train at least one neural network model to recognize each respective distortion and match each respective distortion with each respective distortion filter generator based on the training dataset and the at least one original text document;

receive image data of at least one facsimile having at least one text distortion;

input the received image data of the facsimile to the at least one trained neural network model;

wherein the output of the at least one trained neural network model may be coupled to an input of optical character recognition (OCR) engine;

wherein the at least one trained neural network model and the OCR engine may convert the received image data of the incoming facsimile to machine-encoded text that has been corrected for the at least one text distortion;

store in the memory, the machine-encoded text corrected for the at least one text distortion in the received image data of the incoming facsimile.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
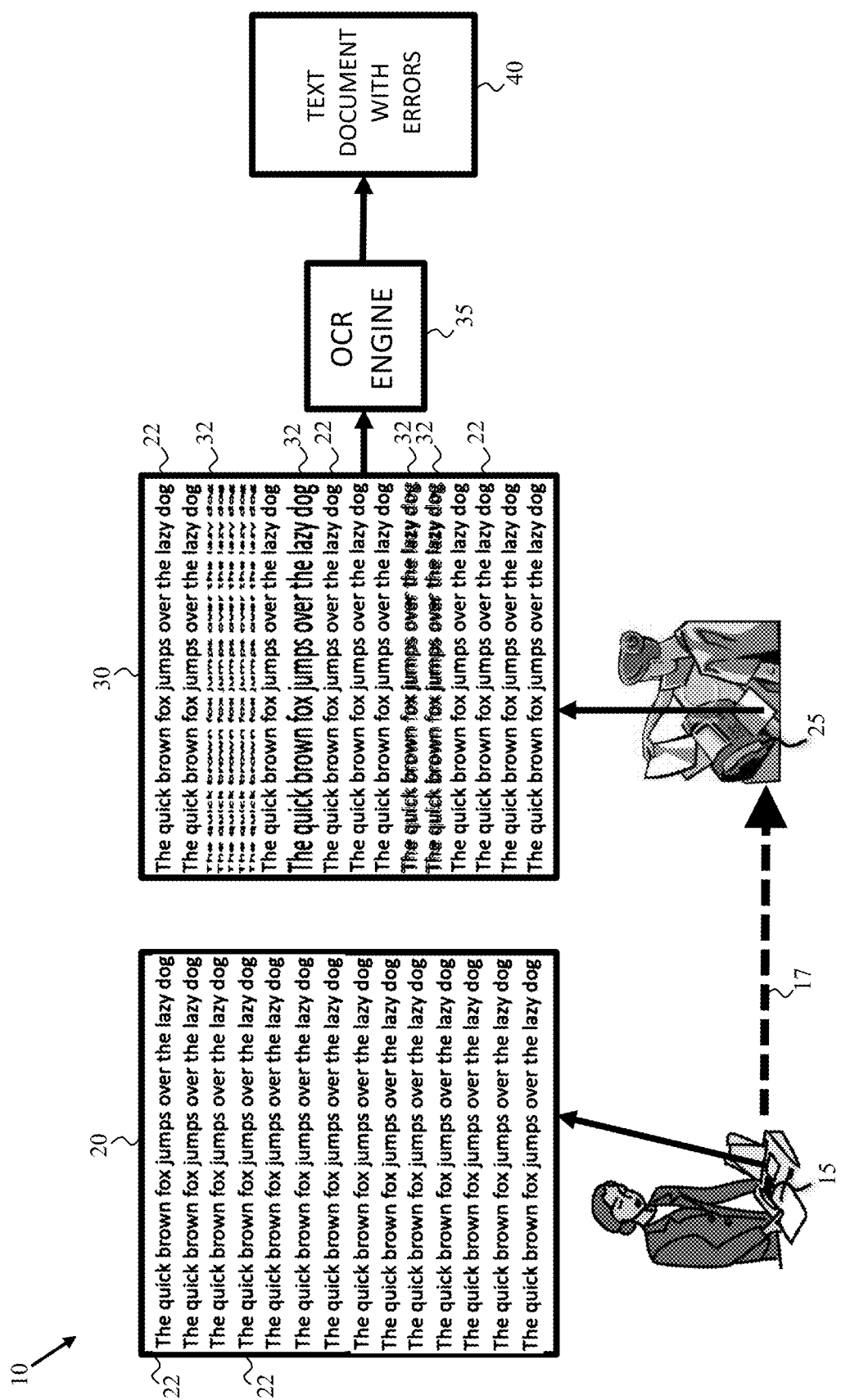
FIG. 1 illustrates a system for sending a facsimile text document and receiving a received facsimile document with textual distortions from the facsimile process, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

When a facsimile text message is sent from over a communication channel, the facsimile message received at the receiving facsimile machine may exhibit textual distortions in the received facsimile image data relative to the original facsimile text message sent at the sending facsimile machine. This may be caused by a plurality of impairments arising from the facsimile process. The text image data in the received facsimile message may be converted to a machine-encoded text document by use of an optical character recognition (OCR) engine. However, many OCR errors may occur in converting a received facsimile message having textual distortions to a machine-encoded text document. A trained machine learning model, such as trained neural network model, may be used to correct these facsimile textual distortions in the received facsimile image data so as to reduce the OCR errors in the machine-encoded text document.

Embodiments of the present disclosure herein describes a system and a method for generating a training dataset using distortion filter generators configured to distort words or letters of words in phrases of text to simulate the plurality of impairments arising from facsimile process. The training dataset may include a plurality of original text documents and a respective plurality of distorted text documents generated using the distortion filter generators. The training dataset may then be used to train a machine learning model, such as a neural network model. After training, the trained machine learning model may be used to correct the text distortions in the received facsimile image data arising from the facsimile process that may be coupled to an OCR engine to generate a machine-encoded text document from the received facsimile without OCR errors.

In the context of the present disclosure, an example of a facsimile document may be a fax, a fax document, and fax message.

FIG. 1 illustrates a system 10 for sending an original text document 20 and receiving a distorted facsimile document 30 with textual distortions 32 from the facsimile process, in accordance with one or more embodiments of the present disclosure. Original text document 20 may be sent from a sending facsimile machine 15 converted to image data which is sent over a communication channel 17 to a receiving facsimile machine 25. Original text document 20 may include undistorted text 22. Receiving facsimile machine 25 may receive distorted facsimile document 30 with undistorted text 22 and textual distortions 32 from the facsimile process. The received distorted facsimile document may be coupled to an optical character recognition (OCR) engine 35 to generate a machine-encoded text document with errors 40.

In some embodiments, OCR engine 35 may be software running in the circuitry (e.g., a processor) of receiving facsimile machine 25. In other embodiments, OCR engine 35 may be executed on a processor of a computer configured to receive image data of received distorted facsimile document 30 with textual distortions 32.

Note that throughout the present disclosure, the original and/or undistorted text in the exemplary facsimile documents may be represented by an exemplary phrase "The quick brown fox jumps over the lazy dog" which is merely for visual clarity and not by way of limitation of the exemplary embodiments of the present disclosure. Any text may be represented by the exemplary embodiments shown herein. Any facsimile-based distortions shown herein may applied to one or more lines of text, a single phrase of text, a single word, one or more letters of text, or any combination thereof.

Figure 2:
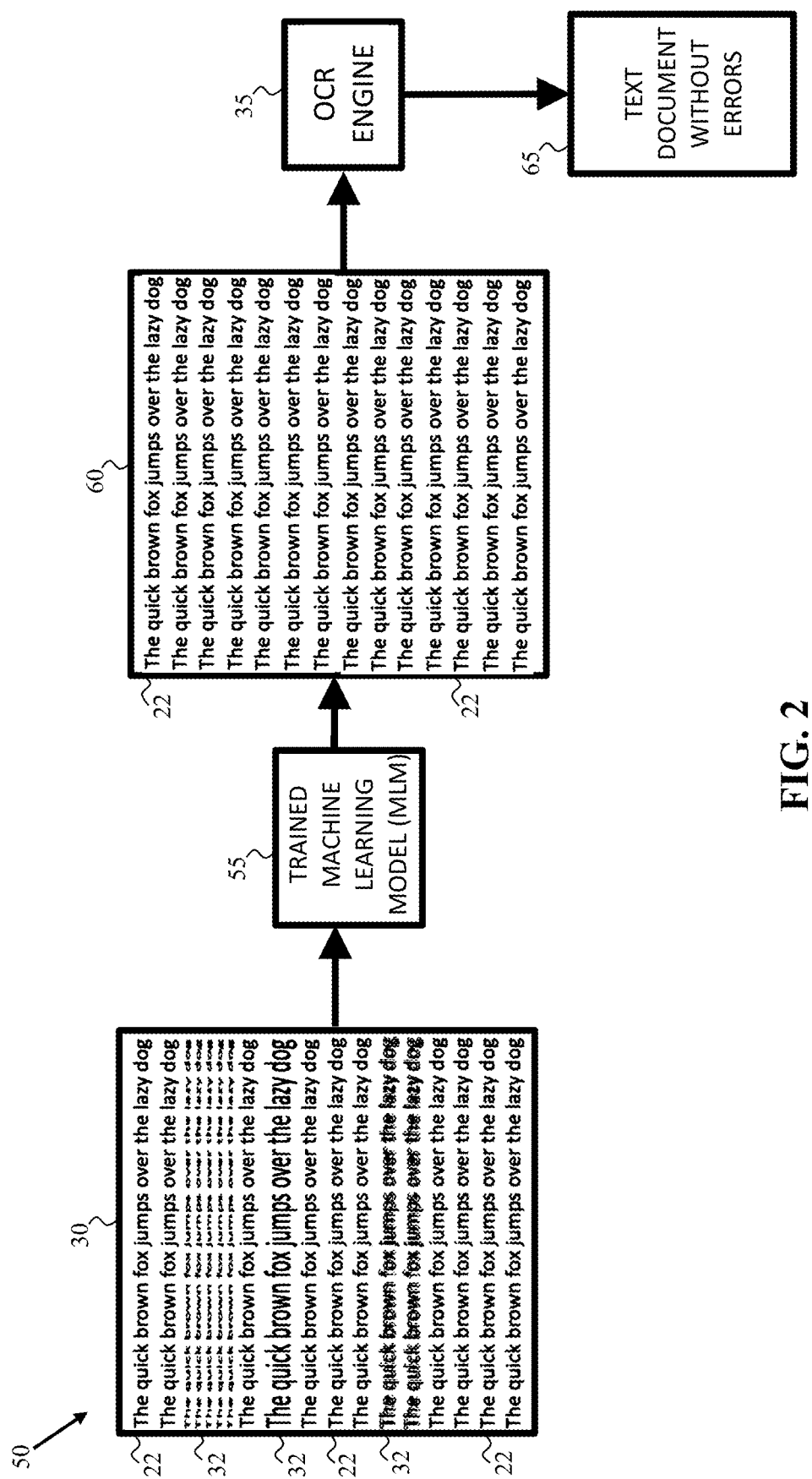
FIG. 2 illustrates an exemplary inventive system for correcting textual distortions in a received facsimile document using a trained machine learning technique/model, in accordance with one or more embodiments of the present disclosure.

FIG. 2 illustrates an exemplary inventive system 50 for correcting textual distortions 32 in received facsimile document 60 using a trained machine learning technique/model (MLM) 55 (e.g., a neural network model), in accordance with one or more embodiments of the present disclosure. In some embodiments, the exemplary inventive system 50 may apply distorted facsimile document 30 having undistorted text 22 and textual distortions 32 from the facsimile process to the input of trained MLM 55. Trained MLM 55 may output a corrected facsimile document 60 in response to the input of distorted facsimile document 30. Corrected facsimile document 60 may be substantially similar to original text document 20. Corrected facsimile document 60 may be applied to OCR engine 35 to generate a text document with reduced errors or without any errors due to the facsimile textual distortions.

In some embodiments, the use of an exemplary inventive trained machine learning technique/model (e.g., exemplary neural network model) solves at least one technical problem associated with correcting these facsimile (e.g., fax) textual distortions in a received facsimile (e.g., fax) image data before input into the OCR engine so as to reduce the OCR errors in the machine-encoded text document. In some embodiments, the use of an exemplary inventive trained machine learning technique/model (e.g., exemplary neural network model), for example, reduces the computing overhead for correcting these textual distortion impairments and subsequently converting the received facsimile image to machine-encoded text using OCR engines.

The facsimile textual distortions may be due to a number of impairments from the facsimile process. For example, a sending facsimile machine may have a page feeder mechanism that does not pull the page through the facsimile document scanner at a uniform speed. As a result, the received facsimile may have text with elongated or compressed characters. On the receiving side of communication channel 17 such as a telephone line, for example, the receiving facsimile may have a bad printer which may cause the printer ink to spread resulting in fat characters printed on the received document page. A person's fingers picking up the printed facsimile message may smudge the characters printed on the received document page.

In some embodiments, the received facsimile may be rescanned by a scanning device to convert the printed facsimile message to image data that may be sent to the trained machine learning model for correction as discussed hereinbelow. In other embodiments, the received facsimile image data prior to printing may be sent to the trained machine learning model for correction as discussed hereinbelow.

In some embodiments, the distinct types of text distortions may be selected from the group consisting of ink smudges on words or letters of words, ink spreading on words or letters of words, text elongation or compression of words or letters of words, words or letters of words distortions from a paper fold, words or letters of words distortions from corner obstructions, words or letters of words distortions from edge obstructions, and distortions from bright or dark regions appearing on words or letters of words (e.g., due to light reflections onto the facsimile scanner). The distinct types of text distortions may include fingerprint smudges and/or dirt on the facsimile scanner (e.g., sending fax) and/or printer heads (e.g., receiving fax).

Figure 3A:
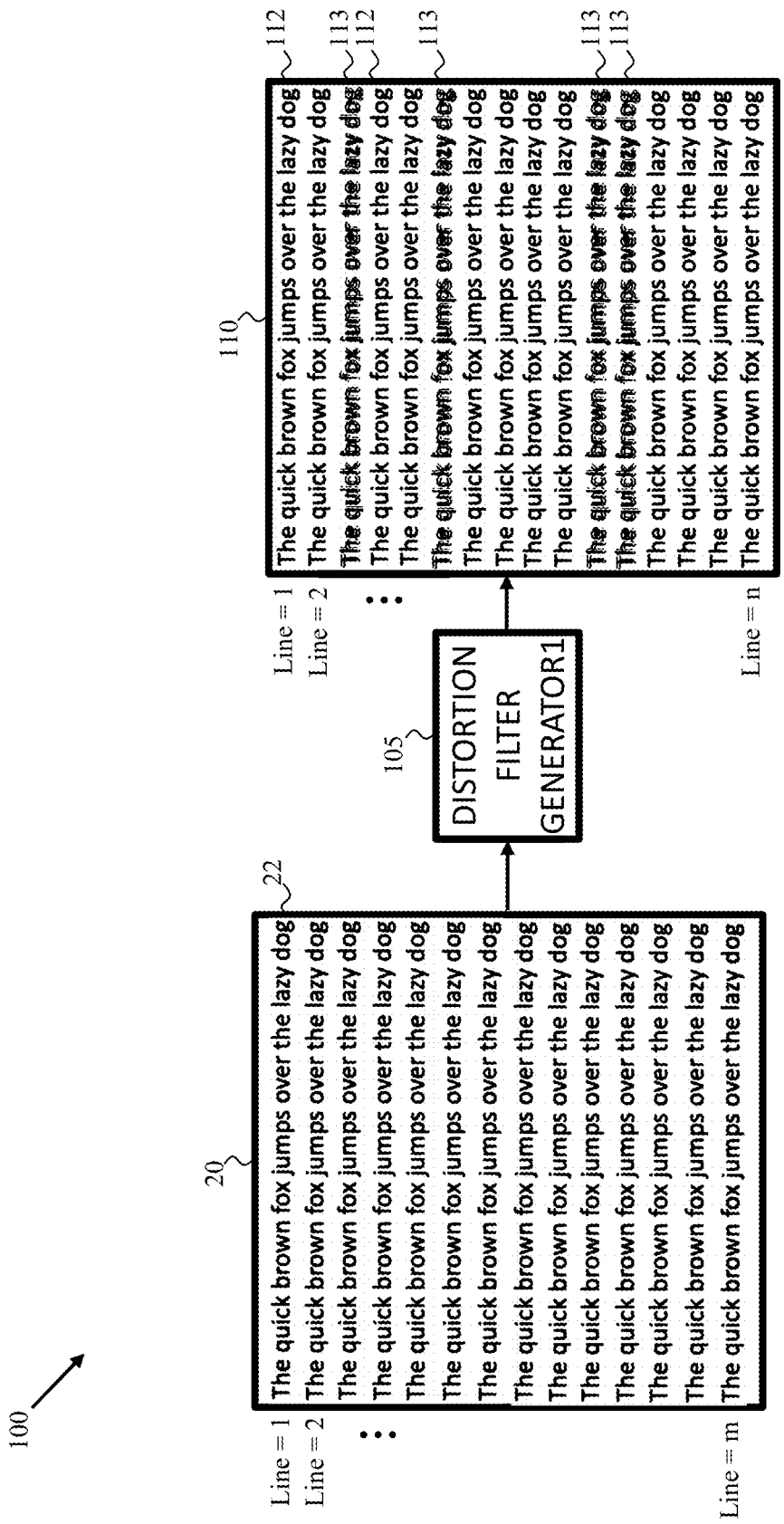
FIGS. 3A-3C depicts exemplary embodiments of distortion filter generators for simulating facsimile text distortions, in accordance with one or more embodiments of the present disclosure.
Figure 3B:
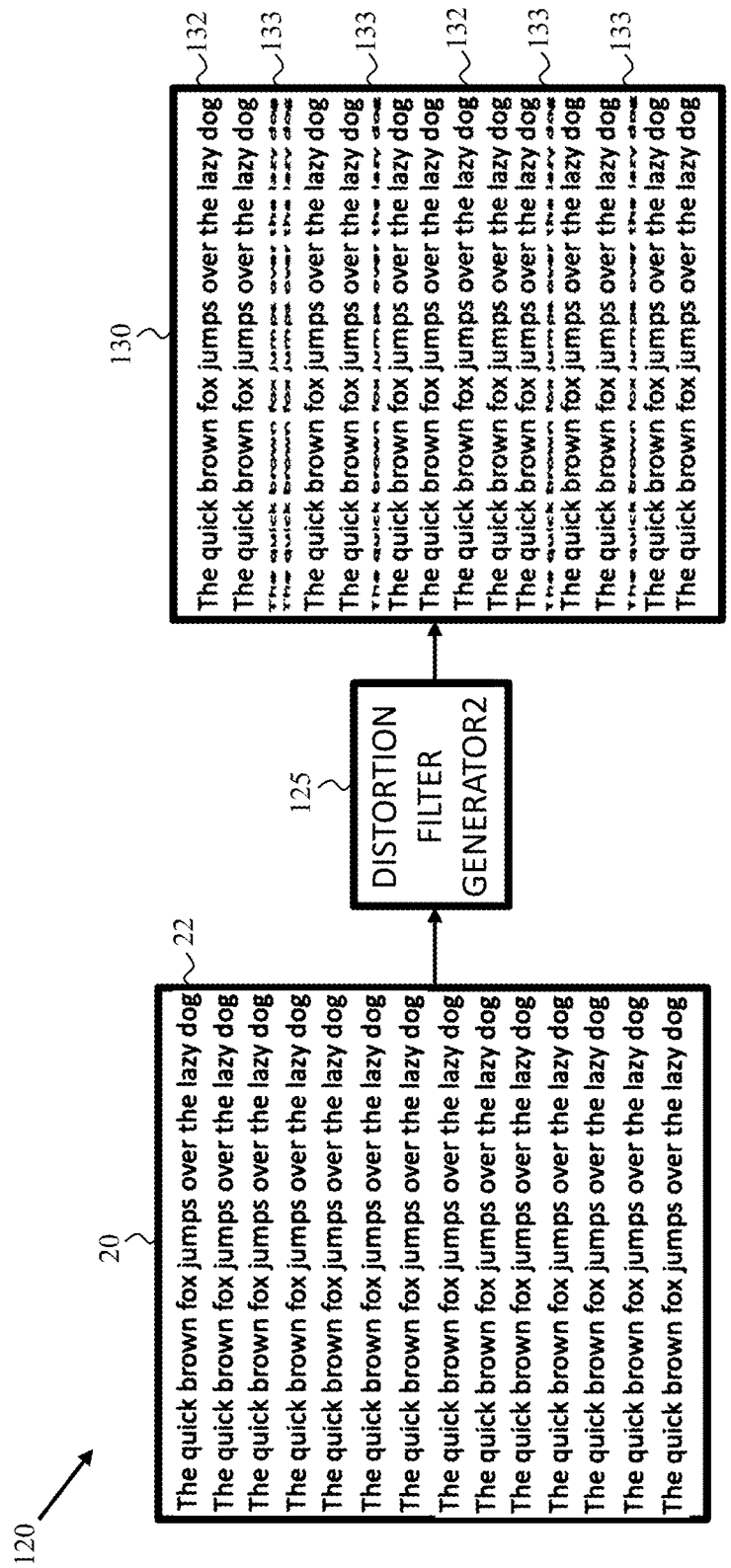
Figure 3C:
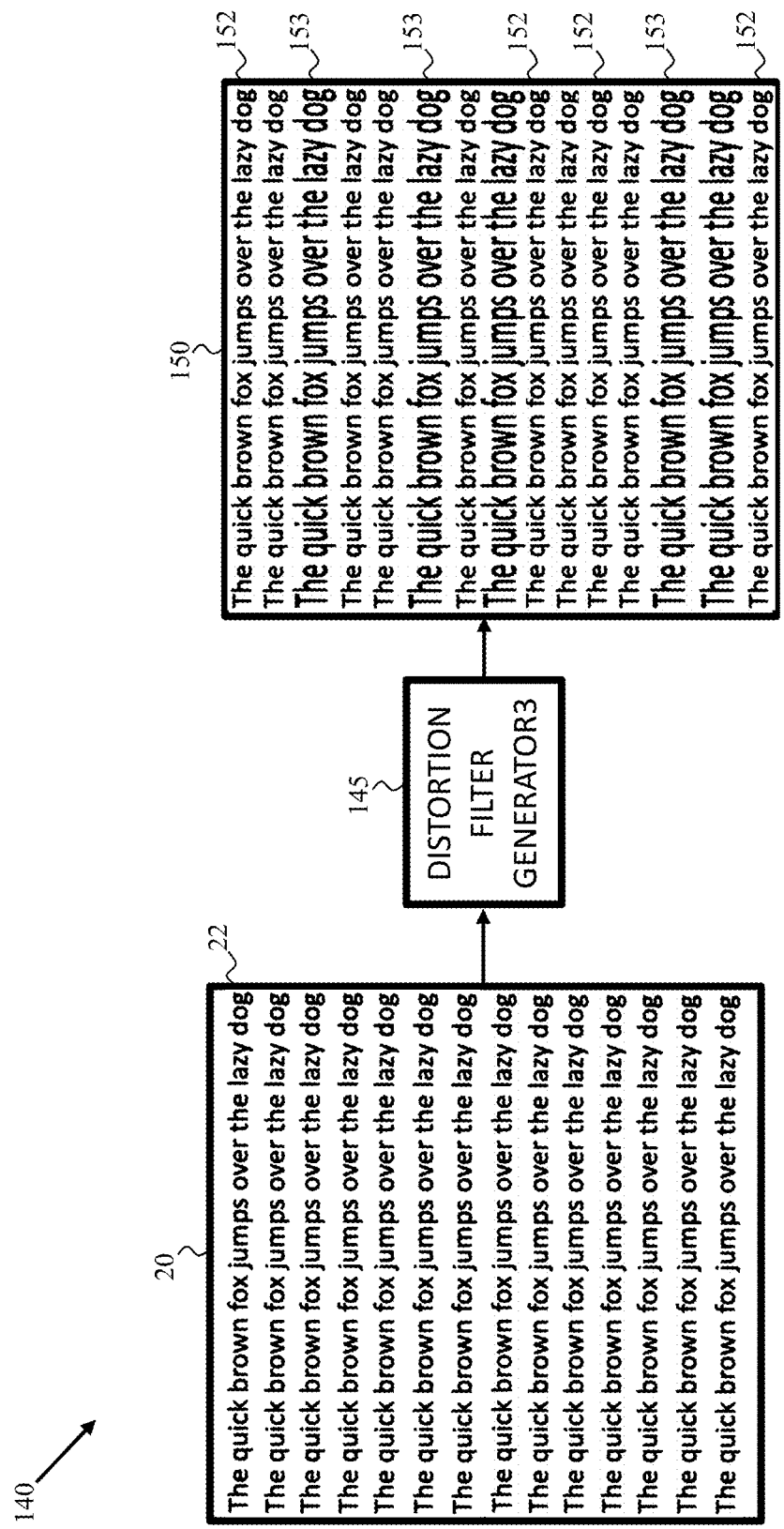

FIGS. 3A-3C depicts exemplary embodiments of distortion filter generators for simulating facsimile text distortions, in accordance with one or more embodiments of the present disclosure.

FIG. 3A depicts a first exemplary embodiment 100 of a distortion filter generator 105 for generating a first type of facsimile text distortion, in accordance with one or more embodiments of the present disclosure. Distortion filter generator 1 (DFG1) 105 may be configured to take lines of undistorted text 22 from original text document 20 and convert original text document 20 to a distorted text document 110 with distorted text 113 and non-distorted text 112. Distortion filter generator 1 105 may distort text 22 as shown in distorted text 113 with ink spreading on words or letters of words.

FIG. 3B depicts a second exemplary embodiment 120 of a distortion filter generator 125 for generating a second type of facsimile text distortion, in accordance with one or more embodiments of the present disclosure. Distortion filter generator 2 (DFG2) 125 may be configured to take lines of undistorted text 22 from original text document 20 and convert original text document 20 to a distorted text document 130 with distorted text 133 and non-distorted text 132. Distortion filter generator 2 125 may distort text 22 as shown in distorted text 133 with text compression of words or letters of words.

FIG. 3C depicts a third exemplary embodiment 140 of a distortion filter generator 145 for generating a third type of facsimile text distortion, in accordance with one or more embodiments of the present disclosure. Distortion filter generator 3 (DFG3) 145 may be configured to take lines of undistorted text 22 from original text document 20 and convert original text document 20 to a distorted text document 150 with distorted text 153 and non-distorted text 152. Distortion filter generator 3 145 may distort text 22 as shown in distorted text 153 with text elongation of words or letters of words.

In some embodiments, the distortion filter generators may include a generative adversarial neural network (GANS) model, a variational autoencoder (VAE), and/or a regular autoencoder. The distortion filter generators may also be referred to as a generator-discriminator. For example, the distortion filter generator may include a discriminator block which is configured to apply the distortion to a particular image of text in the text document, and/or to determine the number of incidences and/or a percentage, or a statistical distribution, that a distinct type of text distortion occurs within the distorted text document.

In some embodiments, the distortion filter generators may be trained using original text documents or pieces of text at the input generating an applied distorted document or distorted pieces of text at the output, where a given distortion filter generator generates a unique type of text distortion.

In some embodiments, the distortion filter generators may use line number indexing (as shown for example in FIG. 3A), word indexing defining the position of a word in the text document for where (e.g., exactly which line and/or words and/or letters in the text) a distinct type of text distortion occurs within the distorted text document, or letter indexing defining the position of the letter to be distorted in original text document 20. Alternatively, and/or optionally, a percentage of incidences that a distinct type of text distortion occurs within the distorted text document may be defined and original text document 20 may be distorted accordingly.

In some embodiments, original text document 20 may use a line number index m shown as (Line=1. Line=2, . . . Line=m) form lines of text, where m is an integer. However, depending on the type of text distortion that the distortion generation filter may apply to the text in original text document 20, the distorted text document may use a line number index n shown as (Line=1. Line=2, . . . Line=n) for n lines of text, where n is an integer as shown in FIG. 3A (by may be applied to all of the exemplary embodiments shown in FIGS. 3A-3C). Usually m=n except for cases, for example, where the distorted text document may include lines of compressed or elongated lines of text which changes the number of lines of text in the distorted text document relative to original text document 20 for a given page size.

Figure 4:
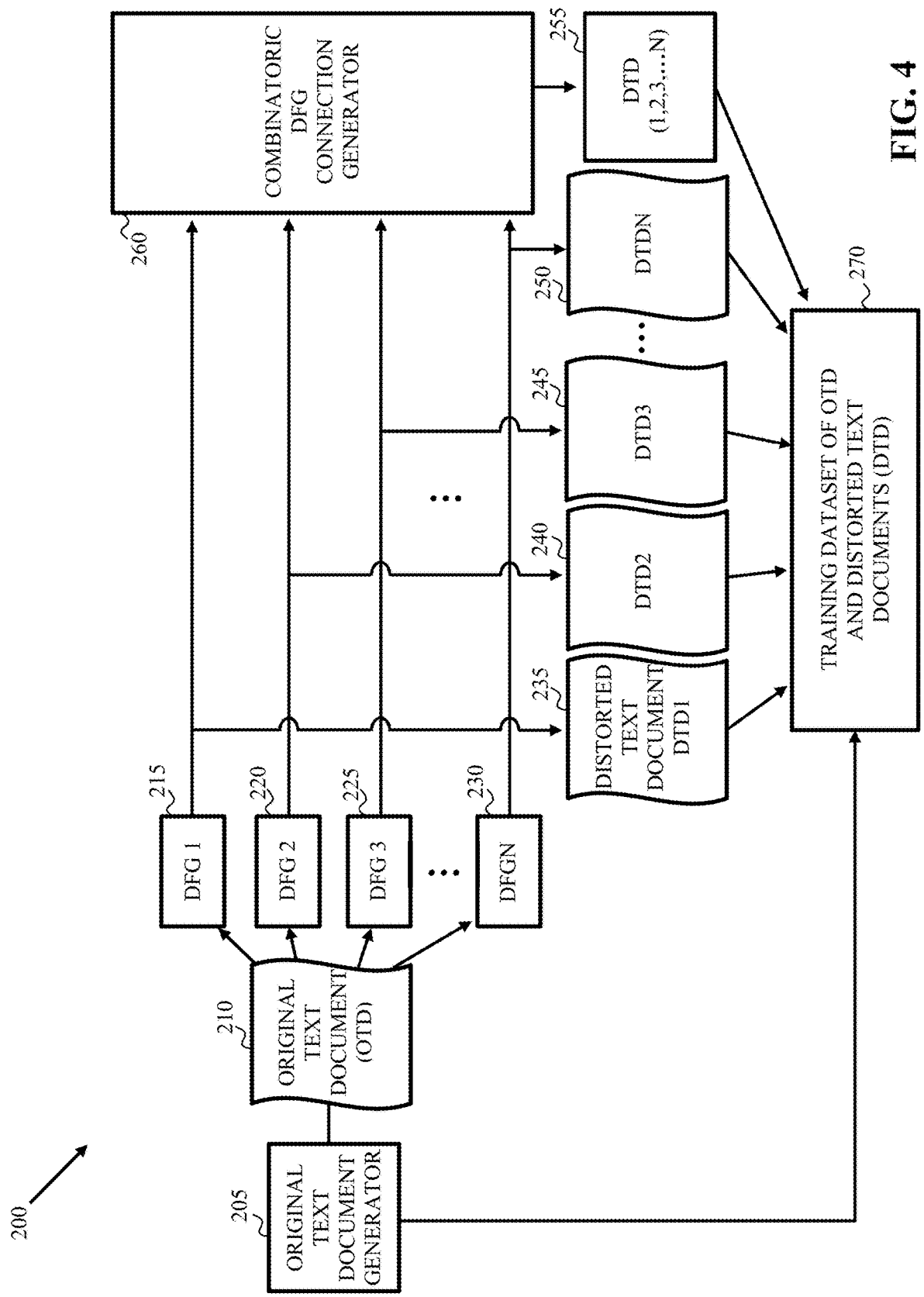
FIG. 4 depicts a block diagram of a combinatoric connection of multiple distortion filter generators for generating a training dataset, in accordance with one or more embodiments of the present disclosure.

FIG. 4 depicts a block diagram of a system 200 using a combinatoric connection of multiple distortion filter generators for generating a training dataset, in accordance with one or more embodiments of the present disclosure. The training dataset may be used to train a machine learning model, such as a neural network model, for removing the facsimile-like textual distortions in the received facsimile image data before being sent to the OCR engine. FIGS. 3A-3C are exemplary embodiments for generating a distorted text document with one type of text distortion based on the distortion generation filter (DFG) applied to the original text document. However, combinations of distortion generation filters may be applied to the original text document to generate a distorted text document with many different types of distortions as shown in system 200.

In some embodiments, system 200 may include an original text document generator 205 to generate an original text document (OTD) 210, which may be added to a training dataset 270 of OTD and distorted text documents (DTD). For example, a plurality of phrases of text from a text database or text corpus, such as from Project Gutenberg, for example, may be used to generate original text document 210 using the plurality of phrases of text.

In some embodiments, OTD 210 may be coupled to the inputs of a plurality of distortion generation filters (e.g., N filters where N is an integer) denoted DFG1 215, DFG2 220, DFG3 225 . . . DFGN 230. Each of the plurality of distortion generation filters may be configured to generate a distorted text document distorted with a distinct type of text distortion, in response to inputting an original text document. In response to inputting OTD 210 to DFG1 215, DFG2 220, DFG3 225 . . . DFGN 230, N distorted text documents denoted DTD1 215, DTD2 220, DTD3 225 . . . DTDN 230 may be outputted with the unique type of text distortion configured for each respective distortion generation filter (e.g., DFG1 215, DFG2 220, DFG3 225 . . . DFGN 230).

In some embodiments, each OTD 210 input and N distorted text documents denoted DTD1 215, DTD2 220, DTD3 225 . . . DTDN 230 may be outputted and stored in training dataset 270.

In some embodiments, each of the N distorted text documents denoted DTD1 215, DTD2 220, DTD3 225 . . . DTDN 230 may be coupled to a combinatoric DFG connection generator 260, which may be configured to generate distorted text documents such as DTD (1, 2, 3, . . . N) 255 which may include each unique type of text distortion generated by the plurality of N distortion generation filters.

In some embodiments, combinatoric DFG connection generator 260 may be configured to apply weights, line number indexing, word indexing, letter indexing, or any combination thereof to each of the plurality of N distortion generation filters, so as to control the position (e.g., line number, word number, and/or letter number), percentage, and/or number of incidences that each DFG applies its unique textual distortion type to original text document (OTD) 210. Thus, in addition to the N distorted text documents denoted DTD1 215, DTD2 220, DTD3 225 . . . DTDN 230 from the output of each of the plurality of N distortion generation filters, combinatoric DFG connection generator 260 may further generate from one input original text document (OTD) 210, any number of distorted text documents 255 with any number of unique type of text distortions in any position that are applied to the one input original text document (OTD) 210. Stated differently, system 200 may generate multiple different output documents with multiple combinations of unique text distortions obtained from applying a single chunk of text (e.g., one original text document) to any combination of DFGs as shown in FIG. 4.

The exemplary embodiments shown in system 200 are merely for conceptual clarity and not by way of limitation of the exemplary embodiments of the present disclosure. For example, in another embodiment (not shown), system 200 may be implemented by one software routine that may relay OTD 210 between any combination of DFGN blocks connected serially in any suitable configuration where the connections between the serially connected DFGN blocks may be configured by combinatoric DFG connection generator 260 using combinatorics, or combinatorial mathematics, for determining the connections and distortion weights, and/or indexing between the DFG blocks. System 200 may generate any number of DTD (1, 2, 3, . . . N) with any unique type of text distortions (1, 2, 3 . . . N) applied to any line, word, and/or letter of the text in original text document (OTD) 210 so as to generate training dataset 270 including a plurality of original text documents and a plurality of distorted text documents generated from each of the plurality of original text documents by the method taught hereinabove.

Figure 5:
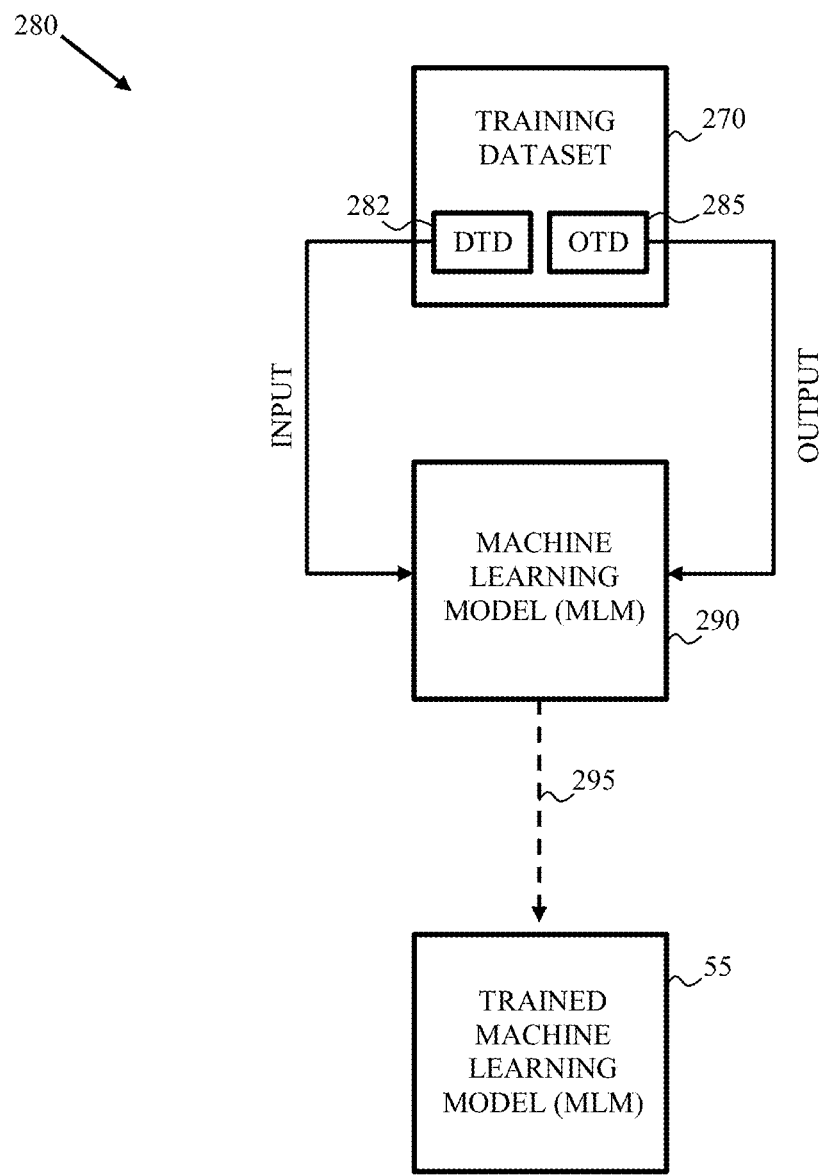
FIG. 5 depicts a block diagram for training a machine learning model with a generated training dataset simulating facsimile-based textual distortions, in accordance with one or more embodiments of the present disclosure.

FIG. 5 depicts a block diagram of a system 280 for training a machine learning model with a generated training dataset simulating facsimile-based textual distortions, in accordance with one or more embodiments of the present disclosure. System 280 may include training dataset 270 including a plurality of DTD 282 applied to the input of a machine learning model 290 and a respective plurality of OTD 285 applied to the output so as to generate 295 trained MLM 55.

In some embodiments, machine learning model 290 may be any suitable classifier neural network model that is trained by training dataset 270. Using training dataset 270, machine learning model 290 may be configured to recognize any type of facsimile-like textual distortion in the received facsimile data image, and to clean up the received facsimile image by removing the distortions in the received facsimile image before being sent to the OCR engine for conversion to machine-encoded text. In this manner, the machine-encoded text may have a minimal number of conversion errors due to the textual distortions in the received facsimile image.

Figure 6:
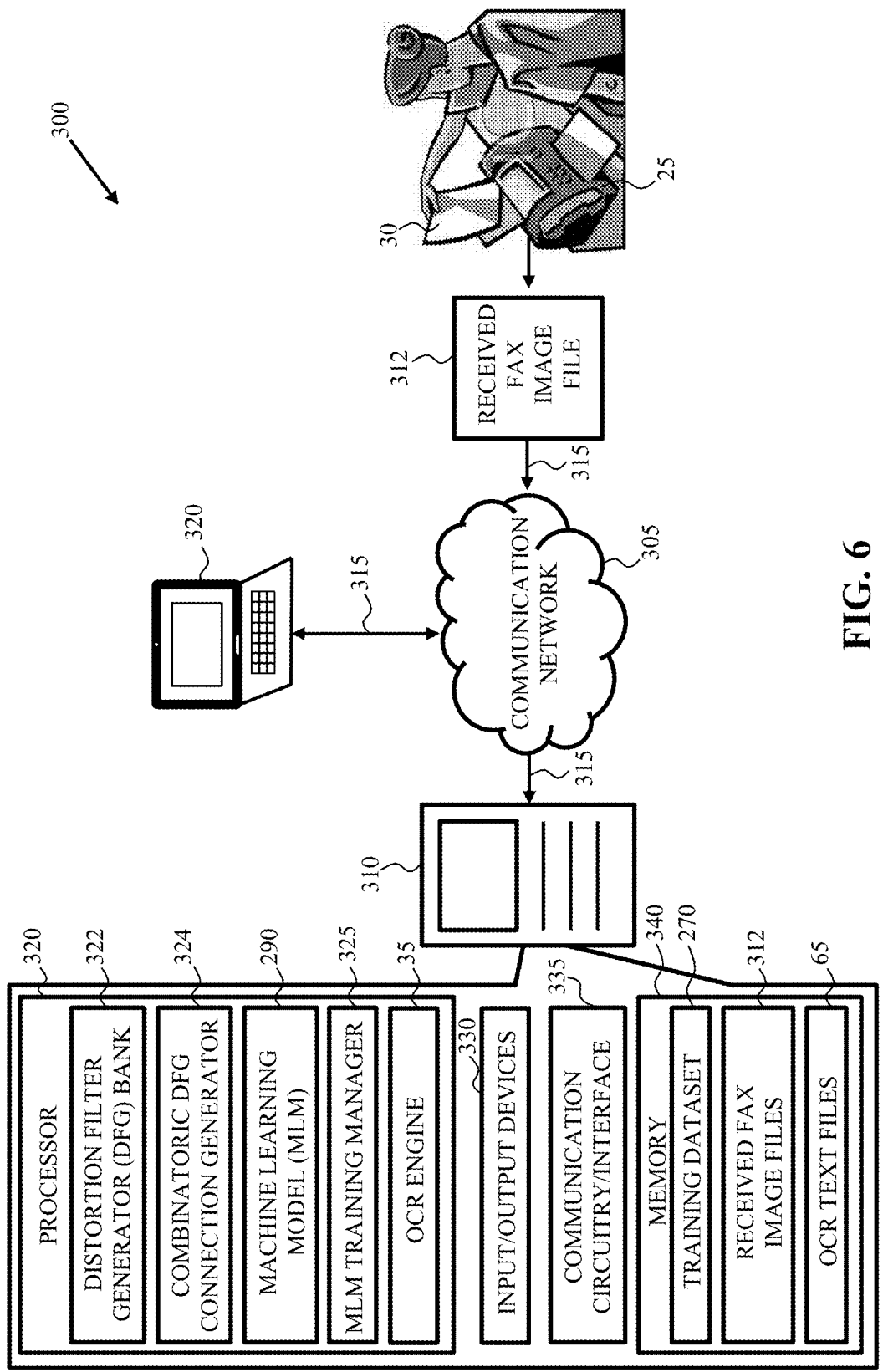
FIG. 6 depicts a block diagram of an improved computer-based system for recognizing and correcting distorted text in facsimile documents, in accordance with one or more embodiments of the present disclosure.

FIG. 6 depicts a block diagram of an improved computer-based system 300 for recognizing and correcting distorted text in facsimile documents, in accordance with one or more embodiments of the present disclosure. System 300 may include receiving facsimile machine 25 receiving distorted facsimile document 30, whose received facsimile image data file 312 may be relayed 315 over a communication network to a server 310 and/or a computer 320.

In some embodiments, server 310 may include a processor 320, input/output devices 330, a memory 340, and communication circuitry/interface 335 for communicating 315 over communication network 305. Processor 320 may be configured to execute software code for performing all of the functions described herein for recognizing and correcting distorted text in facsimile documents. Processor 320 may be configured to execute software modules including a bank 322 of distortion filter generators (DFG) (e.g., the plurality of distortion filter generators), a combinatoric DFG connection generator 324 (e.g., to determine DFG connectivity and/or weighting in bank 322), a machine learning model (MLM) 290, a MLMM training manager 325, and/or an OCR engine 35. Memory 340 may be configured to store training dataset 270, received facsimile image files 312, and/or OCR engine generated text files 65. In other embodiments, computer 320 may include any and/or all of the above elements shown for server 310 and may be configured for recognizing and correcting distorted text in facsimile documents.

In some embodiments, machine learning model 290 may include OCR engine 35. In this case, training dataset 270 may include a plurality of distorted facsimile images and a respective plurality of machine-encoded text documents.

Figure 7:
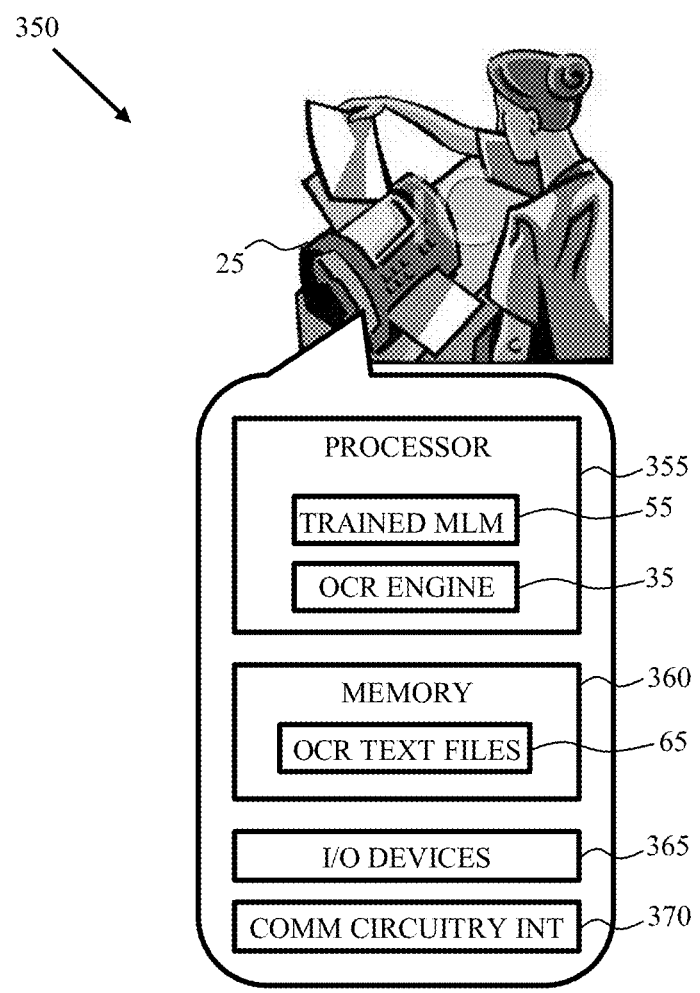
FIG. 7 depicts a second system for recognizing and correcting distorted text in facsimile documents, in accordance with one or more embodiments of the present disclosure.

FIG. 7 depicts a second system 350 for recognizing and correcting distorted text in facsimile documents, in accordance with one or more embodiments of the present disclosure. System 350 may include facsimile machine 25. Facsimile machine 25 may include a processor 355, a memory 360, I/O devices 365, and communication circuitry and interface 370 for communicating over communication network 305, for example.

In some embodiments, processor 355 may be configured to execute trained MLM 55, so as to locally remove text distortions in any received facsimile image data received by facsimile machine 25. OCR engine 35 executed by processor 355 may be configured to generate machine-encoded text from the received facsimile image data cleaned of any textual distortions by trained MLM 55. OCR text files 65 may be stored in facsimile machine memory 360.

In some embodiments, OCR text files 65 may be relayed to a user at computer 320 over communication network 305.

In some embodiments, trained MLM 55 may be generated by server 310 and relayed to processor 355 of facsimile machine 25 over communication network 305.

Figure 8:
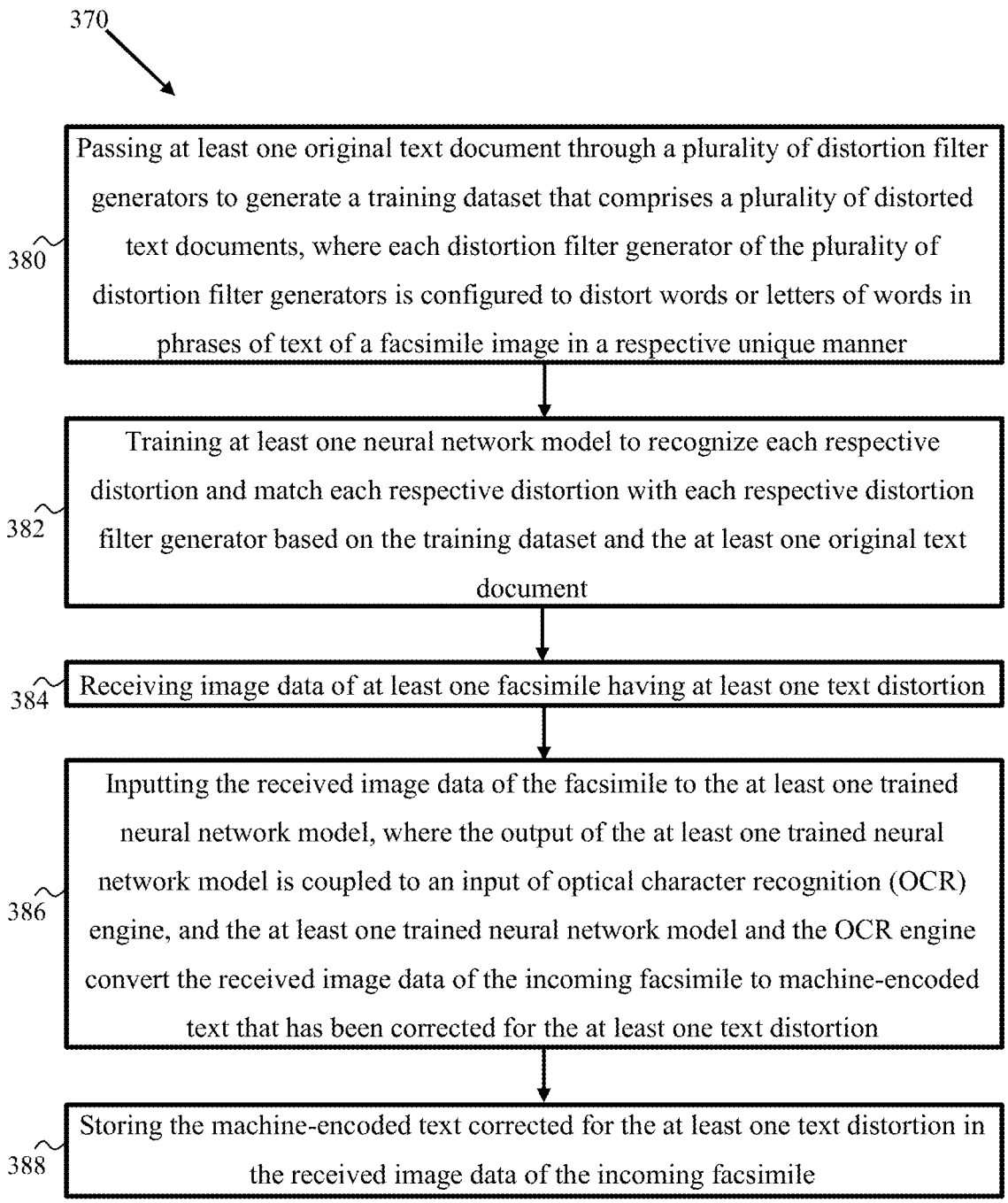
FIG. 8 is shows a flowchart of an improved computer-based method for recognizing and correcting distorted text in facsimile documents, in accordance with one or more embodiments of the present disclosure.

FIG. 8 is shows a flowchart of an improved computer-based method 370 for recognizing and correcting distorted text in facsimile documents, in accordance with one or more embodiments of the present disclosure. Method 370 may be performed by processor 320. The machine learning model may be implemented by a neural network model.

Method 370 may include passing 380 at least one original text document through a plurality of distortion filter generators to generate a training dataset that comprises a plurality of distorted text documents, where each distortion filter generator of the plurality of distortion filter generators is configured to distort words or letters of words in phrases of text of a facsimile image in a respective unique manner.

Method 370 may include training 382 at least one neural network model to recognize each respective distortion and match each respective distortion with each respective distortion filter generator based on the training dataset and the at least one original text document.

Method 370 may include receiving 384 image data of at least one facsimile having at least one text distortion.

Method 370 may include inputting 386 the received image data of the facsimile to the at least one trained neural network model, where the output of the at least one trained neural network model is coupled to an input of optical character recognition (OCR) engine, and the at least one trained neural network model and the OCR engine convert the received image data of the incoming facsimile to machine-encoded text that has been corrected for the at least one text distortion Method 370 may include storing 388 the machine-encoded text corrected for the at least one text distortion in the received image data of the incoming facsimile In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeB SD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 9:
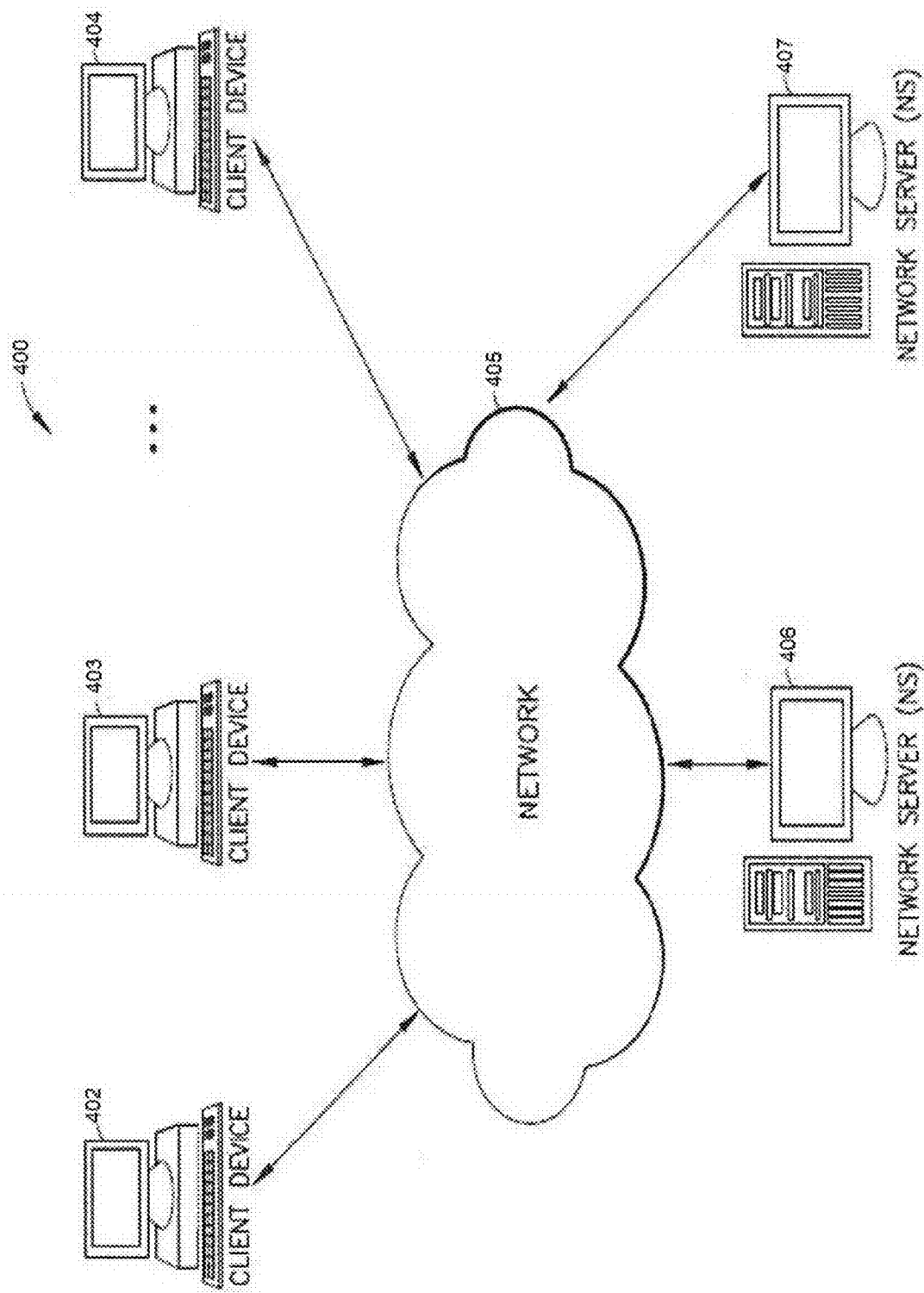
FIG. 9 depicts a block diagram of an exemplary computer-based system/platform, in accordance with one or more embodiments of the present disclosure.

FIG. 9 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 9, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like.

In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 9, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 10:
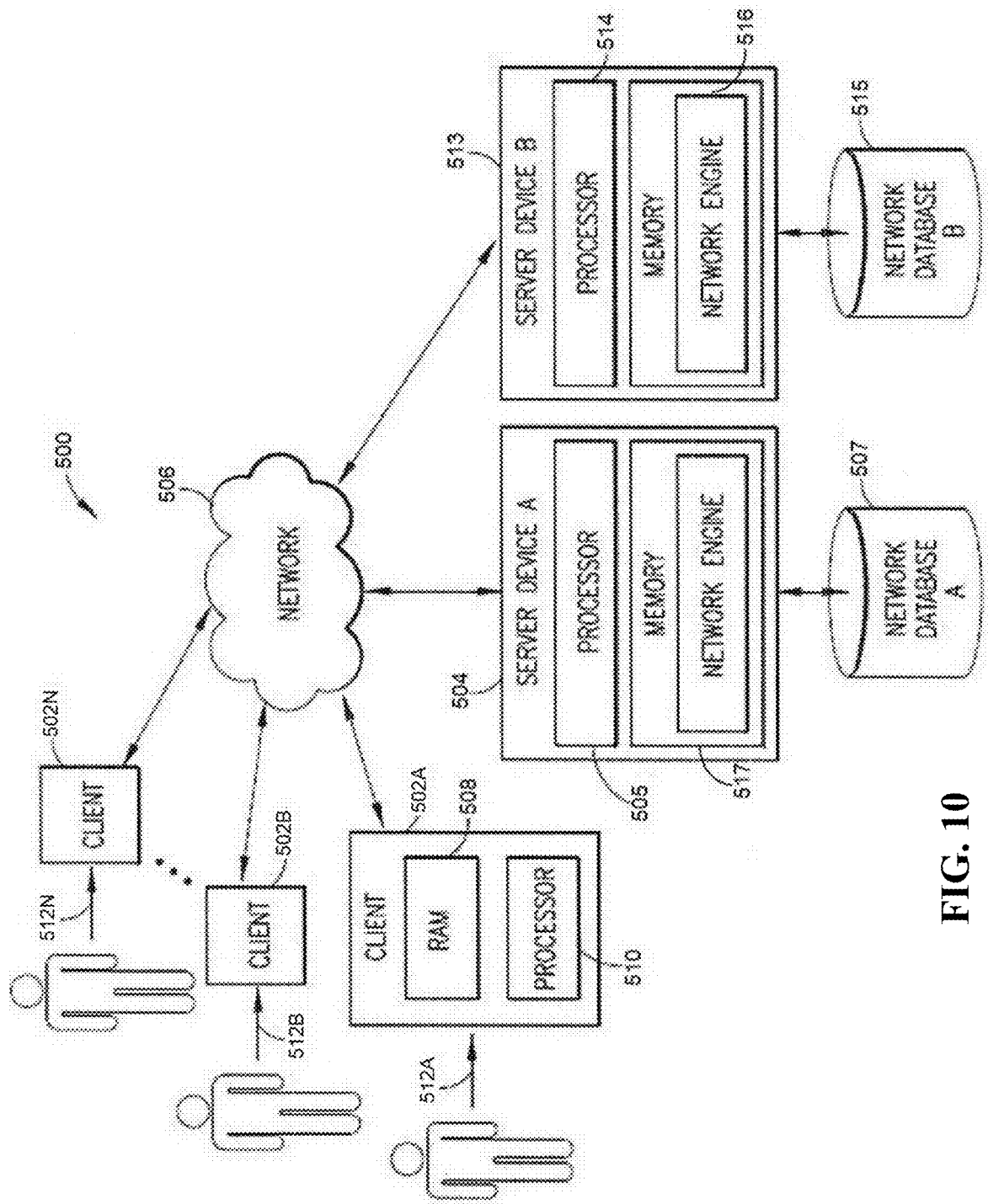
FIG. 10 depicts a block diagram of another exemplary computer-based system/platform, in accordance with one or more embodiments of the present disclosure.

FIG. 10 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™ Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 11:
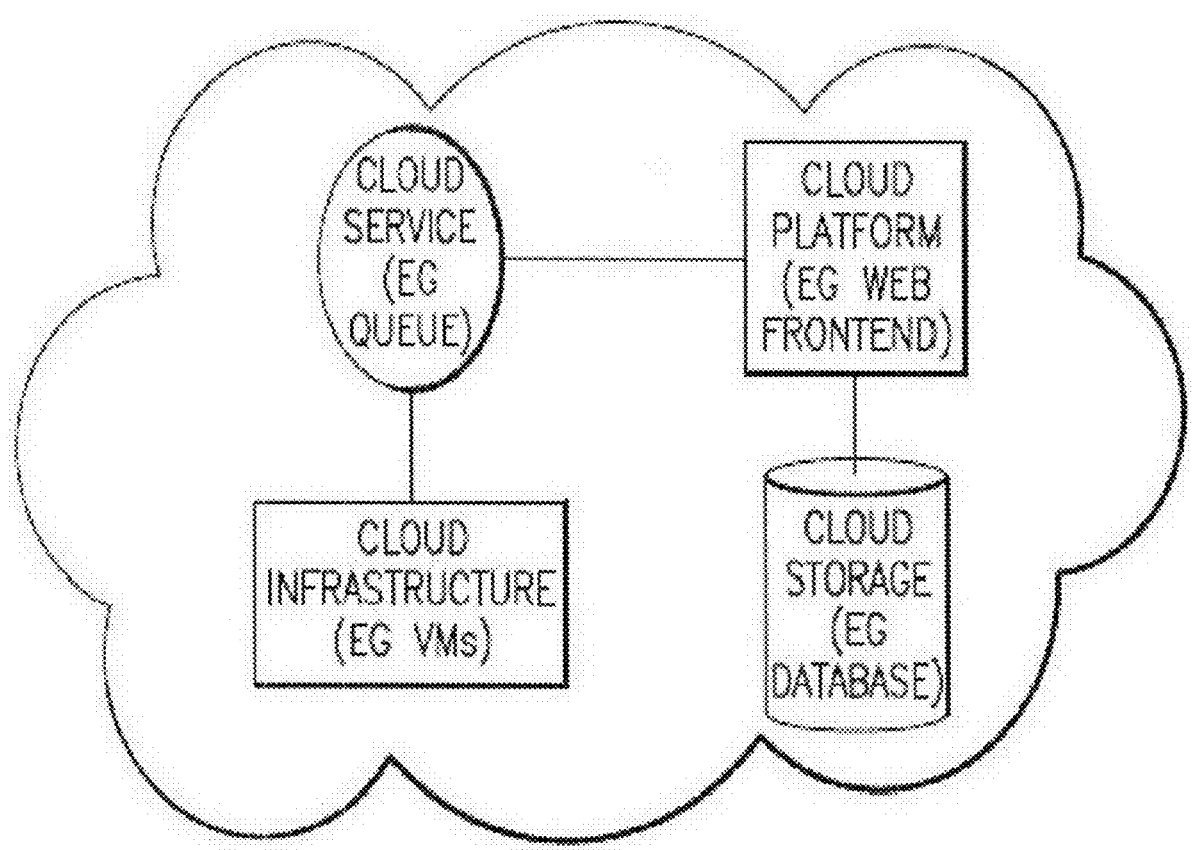
FIGS. 11 and 12 are diagrams illustrating implementations of cloud computing architecture/aspects with respect to which the disclosed technology may be specifically configured to operate, in accordance with one or more embodiments of the present disclosure.
Figure 12:
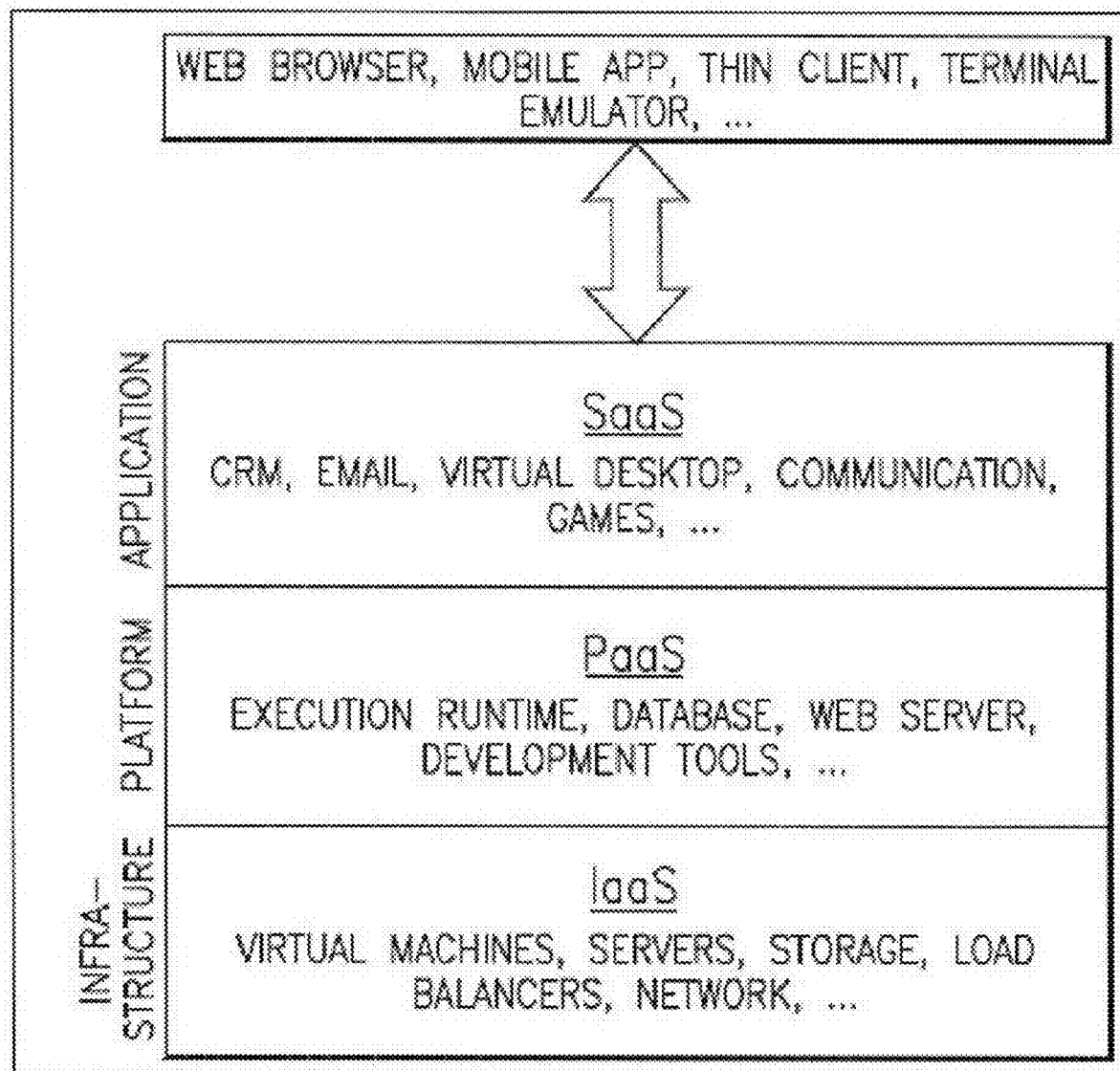

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 11 and 12 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a method may include:

passing, by a processor, at least one original text document through a plurality of distortion filter generators to generate a training dataset that may include a plurality of distorted text documents;

wherein each distortion filter generator of the plurality of distortion filter generators is configured to distort words or letters of words in phrases of text of a facsimile image in a respective unique manner;

wherein each distortion filter generator of the plurality of distortion filter generators is distinct from every other distortion filter generator in the plurality of distortion filter generators;

training, by the processor, at least one machine learning model to recognize each respective distortion and match each respective distortion with each respective distortion filter generator based on the training dataset and the at least one original text document;

receiving, by the processor, image data of at least one facsimile having at least one text distortion;

inputting, by the processor, the received image data of the facsimile to the at least one trained machine learning model;

wherein the output of the at least one trained machine learning model is coupled to an input of optical character recognition (OCR) engine;

wherein the at least one trained machine learning model and the OCR engine convert the received image data of the incoming facsimile to machine-encoded text that has been corrected for the at least one text distortion;

storing, by the processor in a memory, the machine-encoded text corrected for the at least one text distortion in the received image data of the incoming facsimile.

In some embodiments, a method may include:

passing, by a processor, at least one original text document through a plurality of distortion filter generators to generate a training dataset that may include a plurality of distorted text documents;

wherein each distortion filter generator of the plurality of distortion filter generators is configured to distort words or letters of words in phrases of text of a facsimile image in a respective unique manner;

wherein each distortion filter generator of the plurality of distortion filter generators is distinct from every other distortion filter generator in the plurality of distortion filter generators;

training, by the processor, at least one neural network model to recognize each respective distortion and match each respective distortion with each respective distortion filter generator based on the training dataset and the at least one original text document;

receiving, by the processor, image data of at least one facsimile having at least one text distortion;

inputting, by the processor, the received image data of the facsimile to the at least one trained neural network model;

wherein the output of the at least one trained neural network model is coupled to an input of optical character recognition (OCR) engine;

wherein the at least one trained neural network model and the OCR engine convert the received image data of the incoming facsimile to machine-encoded text that has been corrected for the at least one text distortion;

storing, by the processor in a memory, the machine-encoded text corrected for the at least one text distortion in the received image data of the incoming facsimile.

In some embodiments, the plurality of distortion filter generators may be selected from the group consisting of a generative adversarial network (GAN), a variational autoencoder (VAE), and an autoencoder.

In some embodiments, the method may include:

receiving, by the processor, a plurality of phrases of text from a text database or corpus; and generating, by the processor, the at least one original text document using the plurality of phrases of text.

In some embodiments, the method may include training by the processor, each distortion filter generator by using phrases of text with a distinct type of text distortion.

In some embodiments, the distinct type of text distortion may be selected from the group consisting of ink smudges on words or letters of words, ink spreading on words or letters of words, text elongation or compression of words or letters of words, words or letters of words distortions from a paper fold, words or letters of words distortions from corner obstructions, words or letters of words distortions from edge obstructions, and distortions from bright or dark regions appearing on words or letters of words.

In some embodiments, the method may include controlling by the processor, a number of instances that a distinct type of text distortion occurs in each distorted text document in the plurality of distorted text documents by applying a weighted combination of distortion filter generators from the plurality of distortion filter generators to the at least one original text document.

In some embodiments, the method may include controlling by the processor, at least one predefined line of text in the at least one original text document that a distinct type of text distortion is applied by:

indexing each line in the at least one original text document to generate an index;

using the index to apply a distortion filter generator from the plurality of distortion filter generators to the at least one predefined line of text; and wherein the distortion filter generator from the plurality of distortion filter generators generates the distinct type of text distortion.

In some embodiments, the at least one trained neural network model may include the OCR engine.

In some embodiments, the at least one neural network may be a classifier neural network model.

In some embodiments, constructing the training dataset may include:

generating intermediate distorted text documents from an output of each distortion filter generator in a weighted combination of distortion filter generators from the plurality of distortion filter generators;

wherein an input to the weighted combination of distortion filter generators from the plurality of distortion filter generators is the at least one original text document; and storing the intermediate distorted text documents in the training dataset.

In some embodiments, a system may include a memory and a processor. The processor may be configured to:

pass at least one original text document through a plurality of distortion filter generators to generate a training dataset that may include a plurality of distorted text documents;

wherein each distortion filter generator of the plurality of distortion filter generators is configured to distort words or letters of words in phrases of text of a facsimile image in a respective unique manner;

wherein each distortion filter generator of the plurality of distortion filter generators is distinct from every other distortion filter generator in the plurality of distortion filter generators;

train at least one neural network model to recognize each respective distortion and match each respective distortion with each respective distortion filter generator based on the training dataset and the at least one original text document;

receive image data of at least one facsimile having at least one text distortion;

input the received image data of the facsimile to the at least one trained neural network model;

wherein the output of the at least one trained neural network model is coupled to an input of optical character recognition (OCR) engine;

wherein the at least one trained neural network model and the OCR engine convert the received image data of the incoming facsimile to machine-encoded text that has been corrected for the at least one text distortion;

store in the memory, the machine-encoded text corrected for the at least one text distortion in the received image data of the incoming facsimile.

In some embodiments, the plurality of distortion filter generators may be selected from the group consisting of a generative adversarial network (GAN), a variational auto-encoder (VAE), and an autoencoder.

In some embodiments, the processor may be further configured to:

receive a plurality of phrases of text from a text database or corpus; and generate the at least one original text document using the plurality of phrases of text.

In some embodiments, the processor may be further configured to train each distortion filter generator by using phrases of text with a distinct type of text distortion.

In some embodiments, the distinct type of text distortion may be selected from the group consisting of ink smudges on words or letters of words, ink spreading on words or letters of words, text elongation or compression of words or letters of words, words or letters of words distortions from a paper fold, words or letters of words distortions from corner obstructions, words or letters of words distortions from edge obstructions, and distortions from bright or dark regions appearing on words or letters of words.

In some embodiments, the processor may be further configured to control a number of instances that a distinct type of text distortion occurs in each distorted text document in the plurality of distorted text documents by applying a weighted combination of distortion filter generators from the plurality of distortion filter generators to the at least one original text document.

In some embodiments, the processor may be further configured to control at least one predefined line of text in each original text document in the plurality of original text documents that a distinct type of text distortion is applied by:

indexing each line in the at least one original text document to generate an index;

using the index to apply a distortion filter generator from the plurality of distortion filter generators to the at least one predefined line of text; and wherein the distortion filter generator from the plurality of distortion filter generators generates the distinct type of text distortion.

In some embodiments, the at least one trained neural network model may include the OCR engine.

In some embodiments, the at least one neural network may be a classifier neural network model.

In some embodiments, the processor may be configured to construct the training dataset by:

generating intermediate distorted text documents from an output of each distortion filter generator in a weighted combination of distortion filter generators from the plurality of distortion filter generators;

wherein an input to the weighted combination of distortion filter generators from the plurality of distortion filter generators is the at least one original text document; and storing the intermediate distorted text documents in the training dataset.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
    passing, by a processor, at least one original text document through a plurality of distortion filter generators to generate a training dataset that comprises a plurality of distorted text documents;
    wherein each distortion filter generator of the plurality of distortion filter generators is configured to distort words or letters of words in phrases of text of a facsimile image in a respective unique manner;
    wherein each distortion filter generator of the plurality of distortion filter generators is distinct from every other distortion filter generator in the plurality of distortion filter generators;
    training, by the processor, at least one neural network model to recognize each respective distortion and match each respective distortion with each respective distortion filter generator based on the training dataset and the at least one original text document;
    receiving, by the processor, image data of at least one facsimile having at least one text distortion;
    inputting, by the processor, the received image data of the facsimile to the at least one trained neural network model;

wherein the output of the at least one trained neural network model is coupled to an input of optical character recognition (OCR) engine;

wherein the at least one trained neural network model and the OCR engine convert the received image data of the incoming facsimile to machine-encoded text that has been corrected for the at least one text distortion;

storing, by the processor in a memory, the machine-encoded text corrected for the at least one text distortion in the received image data of the incoming facsimile.

2. The method according to claim 1, wherein the plurality of distortion filter generators is selected from the group consisting of a generative adversarial network (GAN), a variational autoencoder (VAE), and an autoencoder.

3. The method according to claim 1, further comprising:
receiving, by the processor, a plurality of phrases of text from a text database or corpus; and
generating, by the processor, the at least one original text document using the plurality of phrases of text.

4. The method according to claim 1, further comprising training by the processor, each distortion filter generator by using phrases of text with a distinct type of text distortion.

5. The method according to claim 4, wherein the distinct type of text distortion is selected from the group consisting of ink smudges on words or letters of words, ink spreading on words or letters of words, text elongation or compression of words or letters of words, words or letters of words distortions from a paper fold, words or letters of words distortions from corner obstructions, words or letters of words distortions from edge obstructions, and distortions from bright or dark regions appearing on words or letters of words.

6. The method according to claim 1, further comprising controlling by the processor, a number of instances that a distinct type of text distortion occurs in each distorted text document in the plurality of distorted text documents by applying a weighted combination of distortion filter generators from the plurality of distortion filter generators to the at least one original text document.

7. The method according to claim 1, further comprising controlling by the processor, at least one predefined line of text in the at least one original text document that a distinct type of text distortion is applied by:
indexing each line in the at least one original text document to generate an index;
using the index to apply a distortion filter generator from the plurality of distortion filter generators to the at least one predefined line of text; and
wherein the distortion filter generator from the plurality of distortion filter generators generates the distinct type of text distortion.

8. The method according to claim 1, wherein the at least one trained neural network model comprises the OCR engine.

9. The method according to claim 1, wherein the at least one neural network is a classifier neural network model.

10. The method according to claim 1, wherein constructing the training dataset comprises:
generating intermediate distorted text documents from an output of each distortion filter generator in a weighted combination of distortion filter generators from the plurality of distortion filter generators;
wherein an input to the weighted combination of distortion filter generators from the plurality of distortion filter generators is the at least one original text document; and storing the intermediate distorted text documents in the training dataset.

11. A system, comprising:
a memory; and
a processor configured to:
pass at least one original text document through a plurality of distortion filter generators to generate a training dataset that comprises a plurality of distorted text documents;
wherein each distortion filter generator of the plurality of distortion filter generators is configured to distort words or letters of words in phrases of text of a facsimile image in a respective unique manner;
wherein each distortion filter generator of the plurality of distortion filter generators is distinct from every other distortion filter generator in the plurality of distortion filter generators;
train at least one neural network model to recognize each respective distortion and match each respective distortion with each respective distortion filter generator based on the training dataset and the at least one original text document;
receive image data of at least one facsimile having at least one text distortion;
input the received image data of the facsimile to the at least one trained neural network model;
wherein the output of the at least one trained neural network model is coupled to an input of optical character recognition (OCR) engine;
wherein the at least one trained neural network model and the OCR engine convert the received image data of the incoming facsimile to machine-encoded text that has been corrected for the at least one text distortion;
store in the memory, the machine-encoded text corrected for the at least one text distortion in the received image data of the incoming facsimile.

12. The system according to claim 11, wherein the plurality of distortion filter generators is selected from the group consisting of a generative adversarial network (GAN), a variational autoencoder (VAE), and an autoencoder.

13. The system according to claim 11, wherein the processor is further configured to:
receive a plurality of phrases of text from a text database or corpus; and
generate the at least one original text document using the plurality of phrases of text.

14. The system according to claim 11, wherein the processor is further configured to train each distortion filter generator by using phrases of text with a distinct type of text distortion.

15. The system according to claim 14, wherein the distinct type of text distortion is selected from the group consisting of ink smudges on words or letters of words, ink spreading on words or letters of words, text elongation or compression of words or letters of words, words or letters of words distortions from a paper fold, words or letters of words distortions from corner obstructions, words or letters of words distortions from edge obstructions, and distortions from bright or dark regions appearing on words or letters of words.

16. The system according to claim 11, wherein the processor is further configured to control a number of instances that a distinct type of text distortion occurs in each distorted text document in the plurality of distorted text documents by applying a weighted combination of distortion filter generators from the plurality of distortion filter generators to the at least one original text document.

17. The system according to claim 11, wherein the processor is further configured to control at least one predefined line of text in each original text document in the plurality of original text documents that a distinct type of text distortion is applied by:
- indexing each line in the at least one original text document to generate an index;
- using the index to apply a distortion filter generator from the plurality of distortion filter generators to the at least one predefined line of text; and
- wherein the distortion filter generator from the plurality of distortion filter generators generates the distinct type of text distortion.

18. The system according to claim 11, wherein the at least one trained neural network model comprises the OCR engine.

19. The system according to claim 11, wherein the at least one neural network is a classifier neural network model.

20. The system according to claim 11, wherein the processor is configured to construct the training dataset by:
- generating intermediate distorted text documents from an output of each distortion filter generator in a weighted combination of distortion filter generators from the plurality of distortion filter generators;
- wherein an input to the weighted combination of distortion filter generators from the plurality of distortion filter generators is the at least one original text document; and
- storing the intermediate distorted text documents in the training dataset.

* * * * *